(12) United States Patent
Heath (10) Patent No.: US 6,883,317 B2
(45) Date of Patent: Apr. 26, 2005

(54) ADJUSTABLE TURBOCHARGER WASTEGATE CONTROLLER SUITABLE FOR AFTER-MARKET INSTALLATION

(76) Inventor: William Dale Heath, 161 Mission View, Ellensburg, WA (US) 90920

( * ) Notice: Subject to any disclaimer, the term of this patent is extended or adjusted under 35 U.S.C. 154(b) by 33 days.

(21) Appl. No.: 10/413,115

(22) Filed: Apr. 14, 2003

(65) Prior Publication Data

US 2003/0196435 A1 Oct. 23, 2003

Related U.S. Application Data

(60) Provisional application No. 60/374,105, filed on Apr. 20, 2002.

(51) Int. Cl.$^7$ .......................... F02D 23/00; F16K 15/00
(52) U.S. Cl. .......................................... 60/602; 137/527
(58) Field of Search ........................... 60/602; 137/527; 92/13.8, 13.2

(56) References Cited

U.S. PATENT DOCUMENTS

| | | | | |
|---|---|---|---|---|
| 3,816,034 A | * | 6/1974 | Rosenquest, Jr. ............ | 92/13.8 |
| 4,893,474 A | * | 1/1990 | Miller et al. ................. | 60/602 |
| 5,673,559 A | * | 10/1997 | Benson ........................ | 60/602 |
| 5,746,058 A | * | 5/1998 | Vertanen ...................... | 60/602 |
| 5,761,983 A | * | 6/1998 | Gotoh et al. ................ | 92/13.2 |
| 6,155,048 A | * | 12/2000 | Vertanen ...................... | 60/602 |

* cited by examiner

Primary Examiner—Thai-Ba Trieu
(74) Attorney, Agent, or Firm—Keith J. Brodie (57) ABSTRACT

An adjustable turbocharger wastegate controller suitable for after-market installation is disclosed. The invention makes use of the existing factory wastegate mechanism to form a fully adjustable turbine-inlet pressure relief. The factory wastegate valve assembly and the wastegate lever-arm connected to the wastegate shaft are utilized. The invention extends the lever-arm, and applies seating pressure to the valve with a spring assembly using a substantially lower spring-rate than the factory assembly. The spring loading is adjustable over a very wide range, and improved pressure regulation is achieved.

13 Claims, 10 Drawing Sheets

Fig 10A — TOP VIEW SHAPED LEVER ARM EXTENSION

Fig 10B — SIDE VIEW SHAPED LEVER ARM EXTENSION

ADJUSTABLE TURBOCHARGER WASTEGATE CONTROLLER SUITABLE FOR AFTER-MARKET INSTALLATION

CROSS-REFERENCE TO RELATED APPLICATIONS

This application claims the benefit of provisional application Ser. No. 60/374,105 filed Apr. 20, 2002.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to the field of turbocharged engines. More specifically, the invention relates to control of the wastegate on a turbocharged engine. The invention is applicable to gasoline or diesel engines.

The wastegate is a valve which, when opened, allows exhaust gas from the engine to bypass the turbine inlet of the turbocharger. This "waste" of exhaust gas limits the turbine inlet pressure, which thereby limits the turbine speed, which further limits the intake manifold boost pressure generated by the turbocharger.

2. Description of the Related Art

There are many different wastegate controllers in the prior art, with a variety of mechanisms for adjusting or maintaining a limiting pressure at the turbine inlet.

U.S. Pat. No. 3,931,712 by Keller, Internal Combustion Engine Turbocharger Pressure Control Regulators discloses a differential pressure activated control system having non-mechanical, remotably controllable, biasing means.

U.S. Pat. No. 4,169,355 by Walsham et al., Turbocharger Wastegate Valve, discloses a cylindrical wastegate valve arrangement which claims decreased likelihood of seizing in the closed position over a conventional poppet valve wastegate.

U.S. Pat. No. 4,174,617 by Jalali-Karchay, Turbocharger Control System, discloses a method of comparing the magnitude of a sea-level reference parameter, with an electrical parameter in a pressure-temperature sensor or sensors coupled to the air induction system of an internal combustion engine, particularly a turbocharged engine. A control signal may be derived from this comparison which will automatically adjust the flow of exhaust gas to the turbocharger and will automatically result in constant engine power from sea level to a critical altitude.

U.S. Pat. No. 4,179,247 by Osborn, Turbocharger having Variable Area Turbine Nozzles, discloses a turbocharger with variable nozzle vane geometry. The vane geometry is varied by means of a control rod loaded with a spring and affixed to a diaphragm sensitive to the compressor output pressure.

U.S. Pat. No. 4,251,050 by McInerney discloses a Turbocharger Control Actuator. The control actuator for a turbocharger comprises a diaphragm-displaced actuator rod projecting outwardly from an actuator housing through a seal permitting axial and angular rod movement for variably positioning a turbocharger wastegate valve.

U.S. Pat. No. 4,256,019 by Braddick, Turbocharger Control Actuator, discloses a wastegate control rod actuating cylinder with a spring-loaded diaphragm and pneumatic coupling points for loading both sides of the diaphragm, such that the control rod is responsive to the differential pressure across the diaphragm.

U.S. Pat. No. 4,283,912 by Cholvin, Turbocharger Control, discloses a pneumatically-operated wastegate valve controller designed to be largely insensitive to altitude variation.

U.S. Pat. No. 4,377,070 by Shadbourne, Turbocharger Control Actuator, discloses a wastegate actuator responsive to compressor inlet pressure during part load engine operation and turbine inlet pressure during full load engine operation.

U.S. Pat. No. 4,403,538 by Rise, Turbocharger Control Actuator, discloses a wastegate control rod actuator comprising a cannister with a pressure sensitive diaphragm attached to the rod and a preloading spring. The rod seal in the cannister is designed to allow for motion of the rod other than strictly axial, and therefore supporting multiple valve types with complex linkages.

U.S. Pat. No. 4,476,682 by McInerney, Turbocharged Internal Combustion Engine having an Altitude Compensated Boost Control and Method for its Operation, discloses a pneumatically controlled altitude compensating boost control for maintaining a constant intake manifold pressure on a turbocharged engine having a wastegate valve for selectively bypassing engine exhaust gas around the turbine.

U.S. Pat. No. 4,490,622 by Osborn, Turbocharger and adaptations thereof, is a continuation-in-part of U.S. Pat. No. 4,179,247 cited above.

U.S. Pat. No. 4,630,445 by Parker, Wastegate Valve For Internal Combustion Engine Turbocharger, discloses a wastegate valve for an internal combustion engine turbocharger comprising a valve head carried by a valve stem and arranged to cooperate with a valve seat in a bypass passage, the valve stem being mounted in a valve guide for movement between a position in which the valve head and valve seat cooperate to close the valve and a position in which the valve head is spaced from the valve seat.

U.S. Pat. No. 4,655,043 by McInerney, Turbocharger, discloses a lightweight, compact turbocharger for small internal combustion engines having a reduced number of component parts for simplified construction, an improved bearing structure and a novel means of transmitting control pressure to the actuator. The control rod attached to the turbine inlet poppet valve actuator is preloaded by a spring housed in a cannister.

U.S. Pat. No. 5,146,753 by Potter, Turbocharged Internal Combustion Engine Having Reduced High Speed Emissions, discloses an internal combustion engine system having reduced high speed emissions comprising an exhaust driven supercharger having turbine pressure dependent control means for regulating turbine pressure and turbine speed to a substantially constant value to produce a decreasing compressor pressure profile with increasing engine speed and to reduce mass air flow through the engine during high speed operation, thereby reducing engine emissions and improving durability.

U.S. Pat. No. 5,172,552 by Elpern et al., Turbocharger With Flexible Cable Wastegate Operating Linkage, discloses an exhaust driven turbocharger includes a wastegate valve which is operated by a pneumatic actuator mounted on the outer edge of the compressor housing. A portion of the linkage interconnecting the actuator with the wastegate valve includes a flexible cable U.S. Pat. No. 5,205,125 by Potter, Turbocharged Internal Combustion Engine Having Exhaust Gas Pressure Actuated Turbine Bypass Valve, is a divisional application from the parent application of U.S. Pat. No. 5,146,753 cited above.

U.S. Pat. No. 5,487,273 by Elpern et al., Turbocharger Having Pneumatic Actuator With Pilot Valve, discloses a pneumatic actuator for controlling the wastegate valve of an exhaust gas driven turbocharger includes a pilot piston which is responsive to boost pressure to open only when a desired boost pressure is attained. Accordingly, premature opening of the wastegate valve is avoided because the main actuator piston is maintained at atmospheric pressure until the desired actuating pressure is attained.

U.S. Pat. No. 5,701,741 by Halsall, Turbochargers For Internal Combustion Engines, discloses an electrically-driven wastegate actuator.

U.S. Pat. No. 6,405,535 by McEwan, Turbocharger with Wastegate Actuator discloses a pneumatic wastegate actuator with a rigid pneumatic line between the compressor housing and the wastegate actuator can.

There are large numbers of turbocharger wastegate controllers in use today. One example of an existing wastegate controller is the factory wastegate controller utilizing a spring-loaded canister, as used in 1993 to 1997 GM® turbo-diesel engines from General Motors Corporation, Wilmington Del. The preferred embodiment of the present invention is an after-market replacement for such a factory wastegate controller. As it is central to the description of the present invention, the prior art controller is described in some detail here. The use of this specific example does not establish the scope of the present invention. The invention is applicable to both gasoline and diesel engines, with and without inter-coolers, and with and without catalytic converters.

Figure 1:
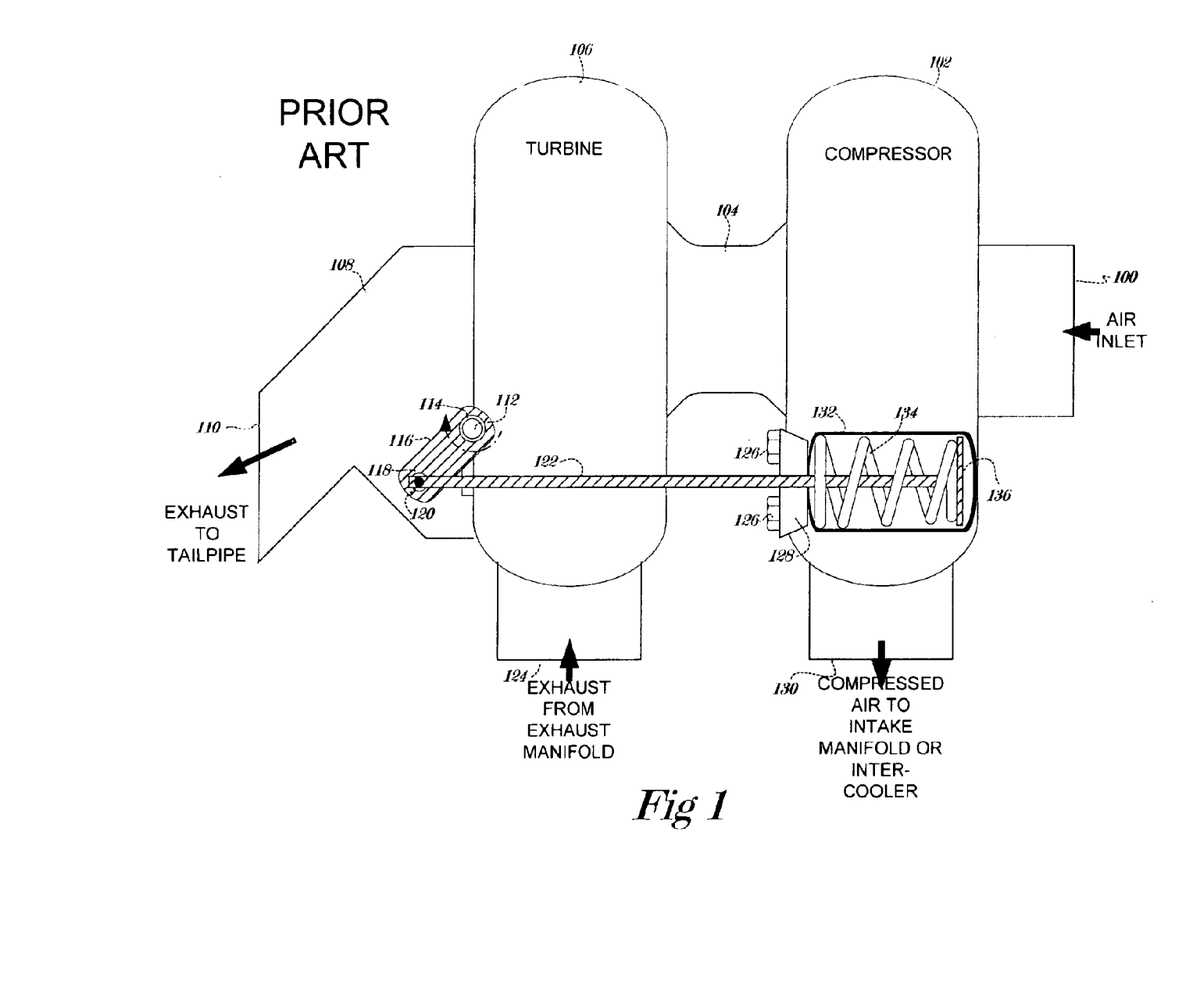
FIG. 1 is a simplified drawing of a turbocharger showing the operation of the prior art wastegate.

FIG. 1 is a simplified drawing of the prior art GM turbo-diesel turbocharger. Exhaust gas from the engine enters the turbine housing (106) through the port on the lower left (124) and puts pressure on the turbine wheel, causing it to spin. The exhaust gas, having passed through the turbine, exits through the exhaust port (110) to the remainder of the exhaust system, typically to a catalytic converter or directly to a tailpipe. The rotation of the turbine is transmitted to a compressor in a compressor housing (102) through a shaft in a shaft housing (104). The spinning compressor compresses air entering the compressor housing through the compressor inlet (100). The compressed air exits the turbocharger through the compressor outlet (130). The compressed air goes on to an inter-cooler or directly into the intake manifold of an engine.

The turbine housing (106) is fitted with a wastegate valve, not visible in FIG. 1. The valve is typically a poppet valve which, when opened, allows exhaust gas to pass directly into the turbine exhaust manifold (108) without having passed through the turbine wheel. The poppet valve moves by rotation about a wastegate shaft (112), such that if the valve changes from a closed to an open position, the wastegate shaft (112) rotates. This shaft exits the turbine housing (106). In FIG. 1, the arrow around the wastegate shaft (112) indicates the direction of rotation to open the valve, and the drawing shows the wastegate shaft (112) and its attached wastegate lever-arm (116) in the closed position.

The wastegate valve is held closed by a counter-clockwise torque applied to the wastegate shaft (112) through the lever arm (116). This torque is the result of the force applied to the lever arm (116) by the control arm (122). The force on the control arm (122), in turn, is applied by a spring (134) acting against a flange (136) on the control arm (122) and the end of the spring canister (132) closest to the lever arm (116). The spring (134) is typically loaded into canister (132) in a compressed state, so that there is some non-zero force required to pull control arm (122) any further out of the canister (132). This initial compression force is transmitted into a force seating the wastegate valve in the closed position.

If the flow of exhaust gas is great enough, the turbine inlet pressure will build-up to a level large enough to overcome this seating force, and blow the wastegate valve open with a clockwise rotation of the wastegate shaft (112). This allows some of the high pressure exhaust gas in the turbine inlet bypass the turbine and flow directly into the turbine exhaust manifold (108). The counter-clockwise torque applied to the shaft, therefore, determines the maximum turbine inlet pressure achievable. Above the maximum pressure, the force on the face of the wastegate will generate a clockwise torque on the wastegate shaft (112) so great as to overcome the preset counter-clockwise torque and open the wastegate valve.

Figure 2A:
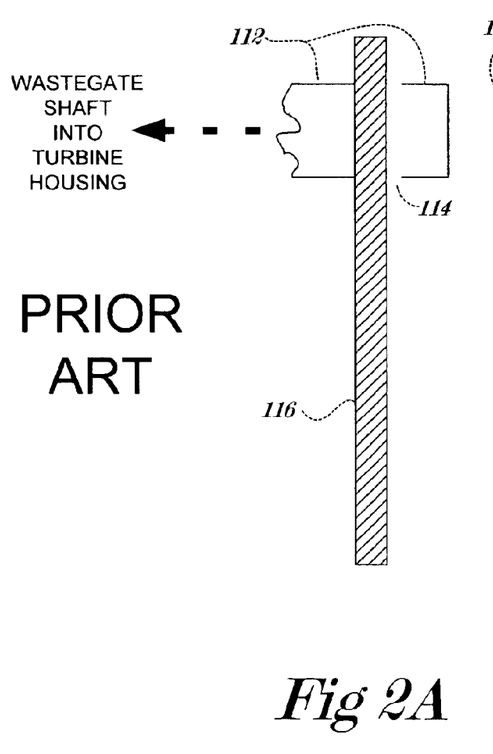
FIGS. 2A and B are views of a prior art wastegate lever-arm.
Figure 2B:
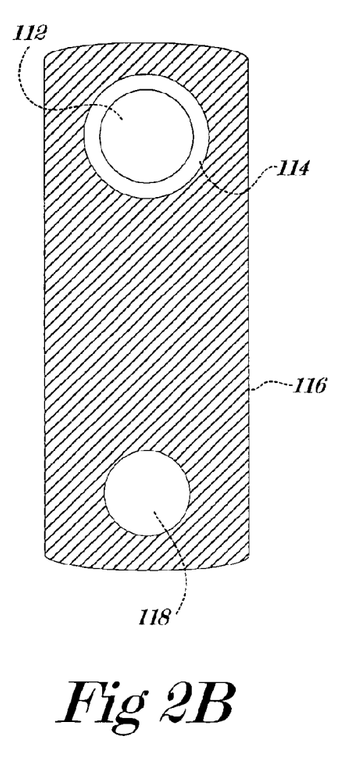

FIG. 2A and FIG. 2B are orthogonal views of a prior art lever-arm (116), typical of the GM turbo-diesel. The lever arm (116) is welded (114) to the wastegate shaft (112). The lever arm has a second through-hole (118) which is used in the connection of the control arm to the lever-arm.

Figure 3A:
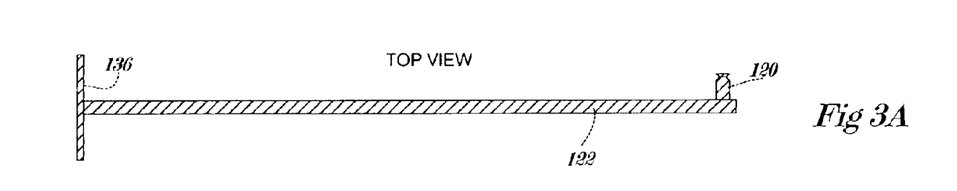
FIGS. 3A, B, C and D are four views of a prior art wastegate controller arm, spring, and spring canister.
Figure 3B:
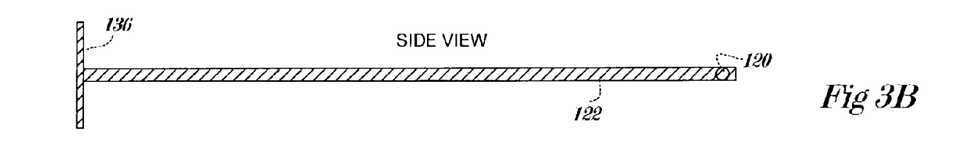
Figure 3C:
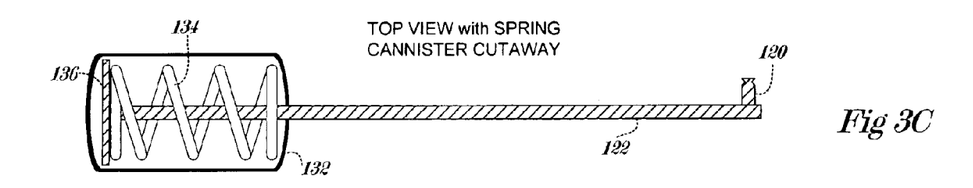
Figure 3D:
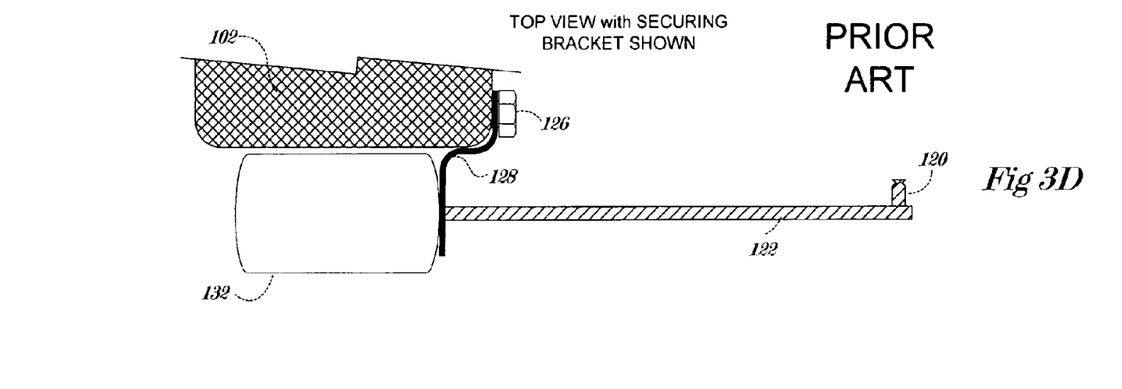

FIGS. 3A, 3B, 3C, and 3D are views of the prior art control arm. FIG. 3A shows the control arm (122) including an pin (120) attached to and part of the control arm designed to fit in the through hole of the lever-arm, FIG. 2 (118), such that the control arm and lever-arm are rotatably attached. The groove in pin (120) accommodates a C-clip, which secures the pin (120) to the lever arm (116). FIG. 3B is the same control arm rotated 90° so that the circular cross-section of the pin (120) is visible. FIG. 3C is a view in the same orientation as FIG. 3A showing the control arm (122) as installed in the spring canister (132), which is cut-away to show the spring (134) acting against one end of the spring canister and the flange (136) at the end of the control am (122). FIG. 3D is another view in the same orientation, now showing the spring canister (132) without the cut-away, as attached to the mounting bracket (128), which is in turn bolted to the compressor housing (102). Bracket (128) is typically welded to the spring canister (132).

BRIEF SUMMARY OF THE INVENTION

To minimize the limitations in the prior art, and to minimize other limitations that will become apparent upon reading and understanding the present specification, the present invention discloses an adjustable turbocharger wastegate controller suitable for after-market installation. In the after-market installation, the invention makes use of the existing factory wastegate mechanism to form a fully adjustable turbine-inlet pressure relief. The factory wastegate valve assembly and the wastegate lever-arm connected to the wastegate shaft are utilized. The invention extends the lever-arm, and applies seating pressure to the valve with a spring assembly using a substantially lower spring-rate than the factory assembly. The spring loading is adjustable over a very wide range, and improved pressure regulation is achieved. It is an object of the present invention to allow the operator of the vehicle a measure of control over the boost pressure limits of the turbocharger not available in the prior art. This highly adjustable wastegate control offers many advantages over the preset wastegate controller. The adjustment allows for operation of the vehicle's turbocharger to be adapted for conditions. There are many conditions for which it may be desirable to adjust the turbine inlet pressure limit, including:

the load the vehicle must carry or tow, the terrain, flat or with a lot of climbing and descents, the altitude and ambient air pressure, and the ambient air temperature.

As an example, an engine required to tow a trailer at high altitude may require higher boost pressure than an unencumbered truck operating at sea-level. The factory wastegate controller must be a one size fits all answer to these variable conditions. The present invention allows for the maximum turbine inlet pressure to be adjusted to meet these variable conditions with the turn of a wrench.

The utility of an adjustable wastegate relief pressure is also apparent from the number of products in the marketplace designed to address it, including electrically and pneumatically operated adjustable wastegate controllers.

It is another of the present invention to increase the length of the lever-arm acting on the wastegate shaft, and thereby reduce the spring-rate required to hold the wastegate valve closed. It is still another object of the invention to reduce the static friction in the control mechanism, and decrease the likelihood that the wastegate valve may stick in the closed position.

DETAILED DESCRIPTION OF THE INVENTION

The invention has been disclosed in provisional application Ser. No. 60/374,105, which includes an appendix presenting the installation instructions for the invention on a GM 6.5L turbo-diesel engine. This application, including appendices, is incorporated herein by reference.

In the following description of the preferred embodiment, reference is made to the accompanying drawings, which for a part hereof, and in which is shown by way of illustration a specific embodiment in which the invention may be practiced. It is to be understood that other embodiments may be utilized and structural changes may be made without departing from the scope of the present invention.

Figure 4:
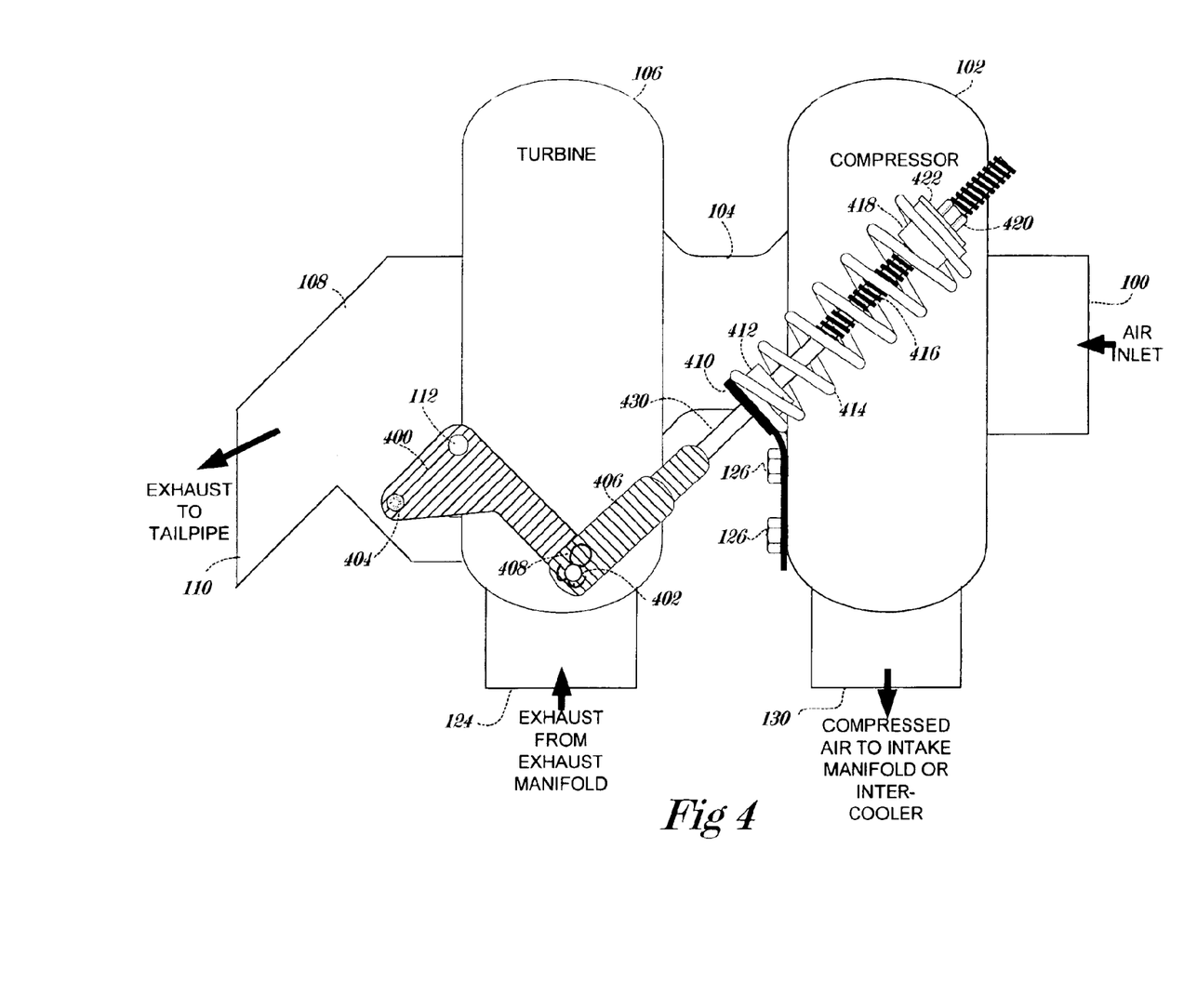
FIG. 4 is a simplified drawing of a turbocharger with the wastegate controller of the present invention installed.

FIG. 4 shows the preferred embodiment of the present invention, an after-market installation of the new wastegate controller on to replace the prior art controller shown in FIG. 1. A lever-arm extension (400) has been installed over the factory wastegate lever-arm (116). It is secured to the wastegate lever-arm at two points. First, the wastegate shaft (112) extends through a first through-hole (FIG. 5., 500) in the lever-arm extension. A second through-hole in the lever-arm extension (FIG. 5., 502) is secured coaxially to the through hole in the lever-arm (FIG. 2, 118) with a bolt (FIG. 4, 404) and a nut behind the lever-arm not visible in the view of FIG. 4. This secures the lever-arm extension rigidly to the wastegate lever-arm such that they rotate together.

Figure 5A:
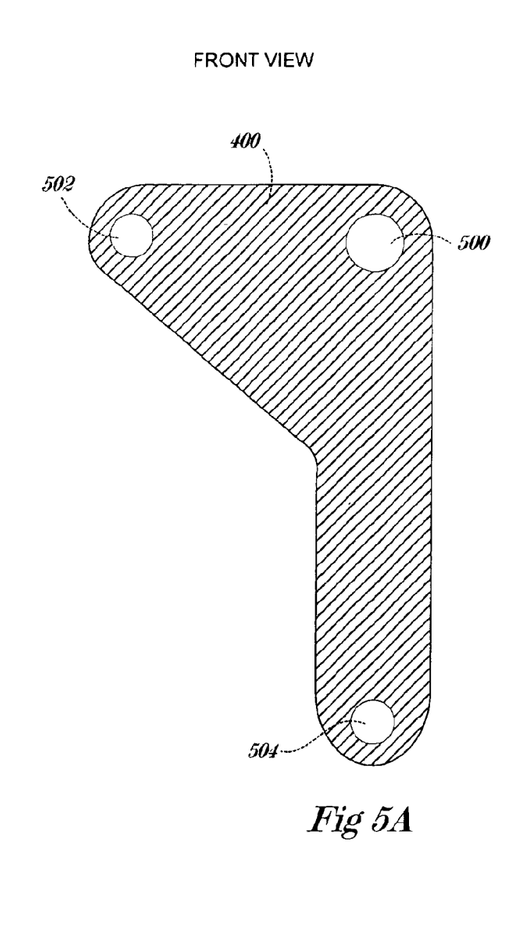
FIGS. 5A, B, and C are views of the preferred embodiment lever-arm extension.
Figure 5B:
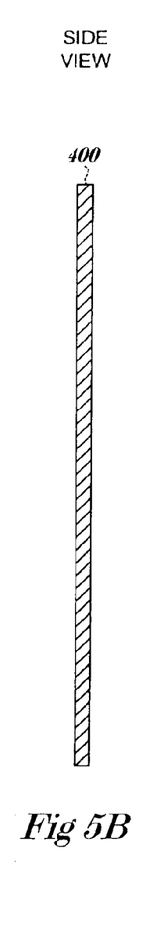
Figure 5C:
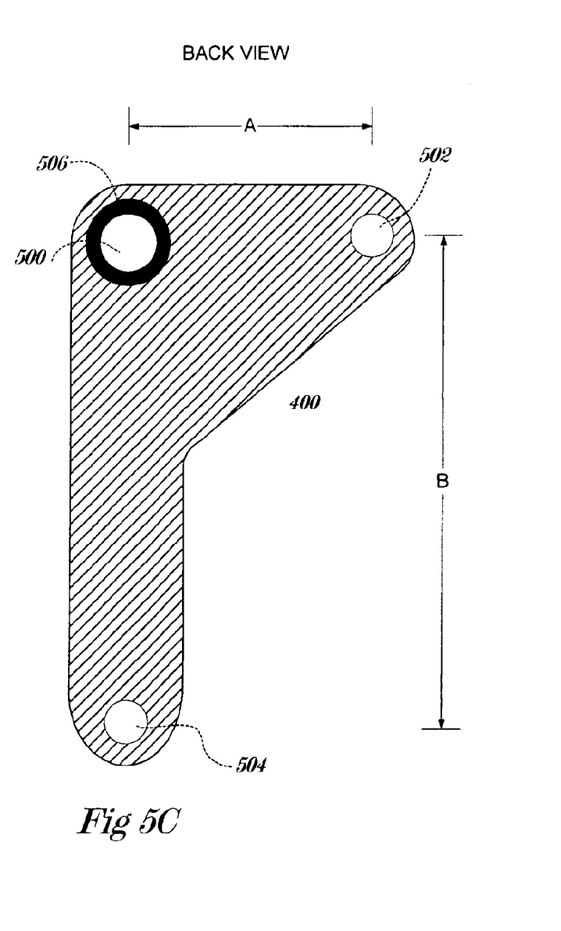

Referring to FIG. 5., the lever-arm extension is rotating about a shaft passing through the first hole (500). The face of the lever-arm extension facing the wastegate lever-arm (FIG. 5C) has counter-sinking (506) around the first through-hole such that the lever-arm extension fits flush to the wastegate lever-arm. The counter-sinking leaves room for the weld material (FIGS. 2A, 2B, 114).

Dimension A in FIG. 5 is the original distance between the axis of rotation for the wastegate lever-arm and point of attachment of the factory control arm (FIG. 1, 122) to the wastegate lever-arm (FIG. 1, 120). Dimension B in FIG. 5 is the distance between the axis of rotation for the wastegate lever-arm and the point of attachment for the control arm of the present invention. Referring to FIG. 4, the control arm of the present invention is secured to the lever-arm extension by means of a clevis pin (402) passing through an aligned hole (504) in the lever-arm extension (400) and the control arm (FIG. 6B, 600). The clevis pin is secured by a cotter pin (408) passing through a hole in its shank. The longer lever-arm distance of the present invention (dimension B) over the factory installation (dimension A) means that the same force can be applied to the wastegate valve with less force applied through the new control arm (430) than the old control arm (122) and a lower spring-rate in the new spring (414) relative to the original (134).

Note that the through-holes (500, 502, 504) in the lever-arm extension (400) are not collinear. There is no need for them to be, the relevant distances are from the center of the through-holes (502, 504) to the center of the axis of rotation of the wastegate shaft (500), indicated by the countersunk through-hole. Any shape which accomplishes the purpose of providing an extended lever-arm distance from the factory lever-arm is within the spirit of the invention, and alternative shapes may be used to provide for parts clearance and advantageous placement of the control arm.

Figure 6A:
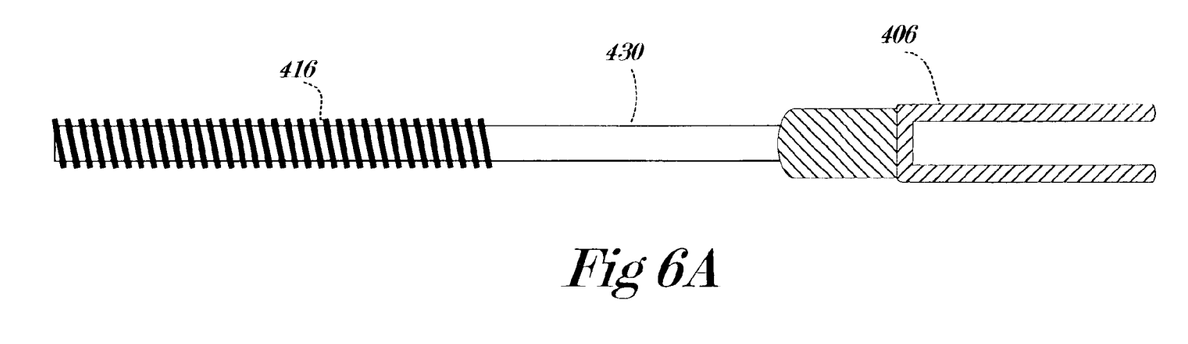
FIGS. 6A and B are views of the controller arm of the present invention.
Figure 6B:
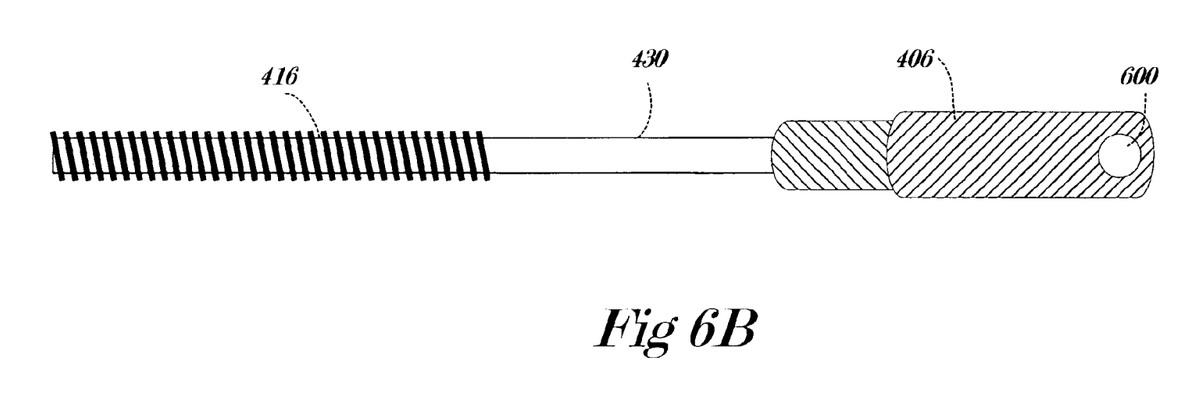

FIGS. 6A and 6B are two orthogonal views of the control arm (430) of the present invention. The threaded end (416) serves as part of the boost pressure adjustment mechanism. The other end is forked into two tongs (406). Each tong has a through-hole (600). The shank of the clevis pin (402) passes through the hold in one tong, then through the hole in the lever-arm extension (FIG. 5, 504), then through the hole (600) in the second tong (406). The clevis pin is then secured with a cotter pin and serves as the shaft about which the control arm (430) is rotatably attached to the lever-arm extension (400). This mechanism of rotatably attaching the lever-arm extension to the control arm is one of many possible variations obvious to one skilled in the art. Other means of rotatably attaching the lever-arm extension to the control arm can be substituted without departing from the spirit or scope of the present invention.

Figure 7A:
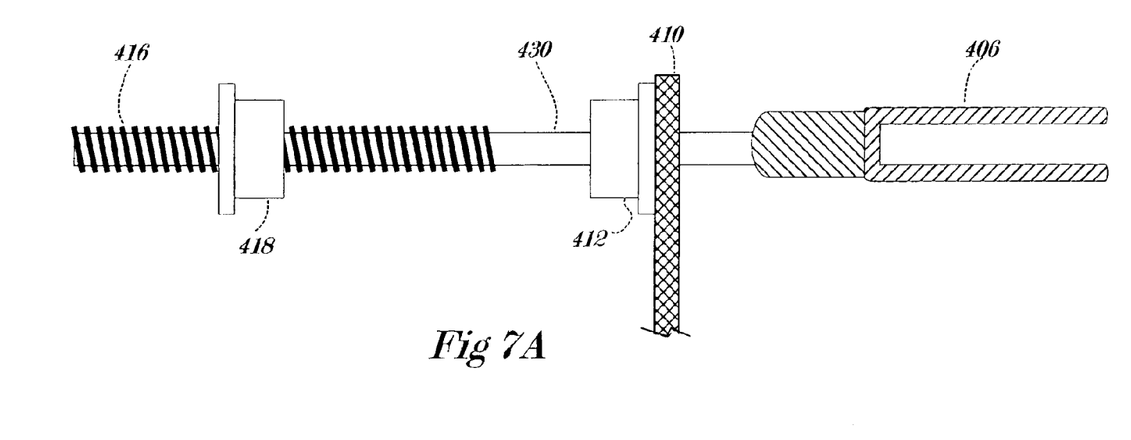
FIGS. 7A and B are views of the controller arm of the present invention showing the positioning of other elements.
Figure 7B:
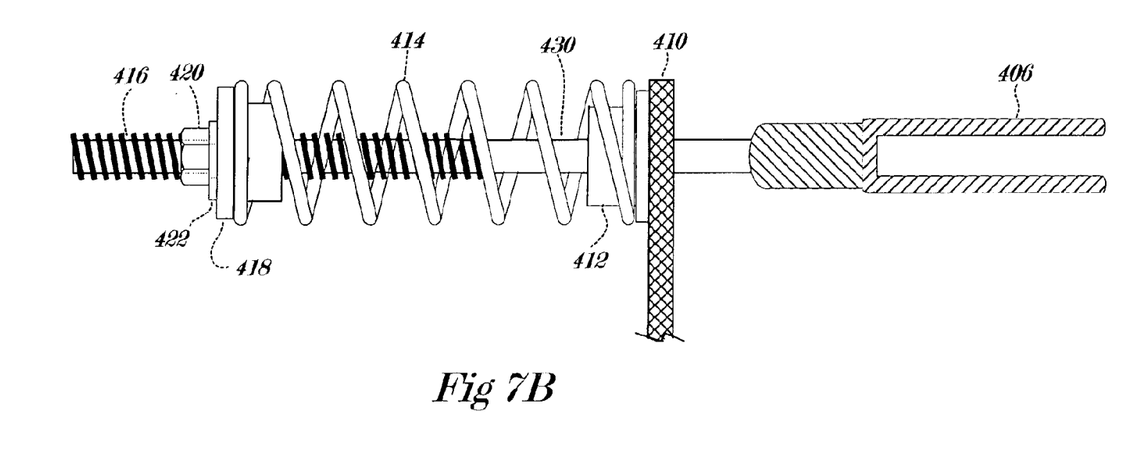

FIGS. 7A and 7B are two views of the control arm (430) shown with other elements of the invention so their arrangement is clearly disclosed. FIG. 7A shows the control arm passing through the bracket (410) with spring caps mounted in opposing orientations on the control arm. There is sufficient clearance for the control arm (430) to slide back and forth through the hole in the bracket (410) and for the outer spring cap (418) to slide back and forth on the control arm (430). In the preferred embodiment the inner spring cap (412) is of the same dimensions as the outer spring cap and can also slide back and forth over the control arm. The inner spring cap could equally well be affixed to or manufactured as part of the bracket (410). In FIG. 7B, the spring caps (412, 418) are shown capturing the spring (414) with the outer spring cap held onto the control arm by the washer (422) and the adjusting nut (420).

Figure 8A:
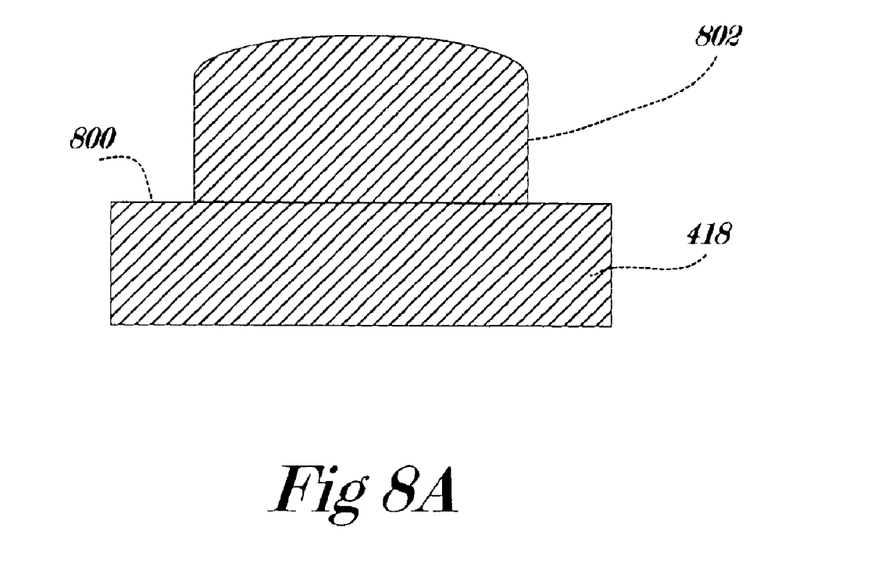
FIGS. 8A and B are views of the spring cap of the present invention.
Figure 8B:
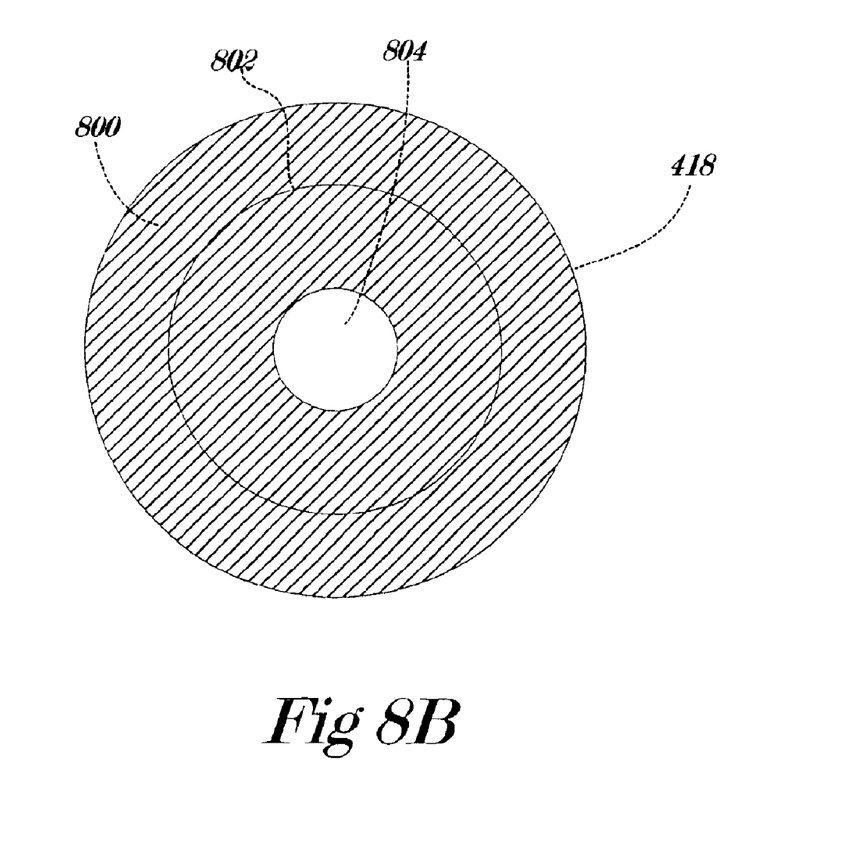

FIGS. 8A and 8B are orthogonal views of the outer spring cap (418). The end of the spring (414) sits against surface (800) when the spring cap is installed over the spring. The cylindrical surface (802) of the spring cap (418) seats against the inside of the spring's (414) coils. The spring cap has a through-hole (804) down the axis of symmetry of sufficient diameter to allow the spring cap (418) to slide over the threaded end of the control arm (416). In the preferred embodiment, the inner spring cap (412) is of the same type and size as the outer spring cap (418). Any equivalent means of securing the spring in position around the control arm at the bracket (410) could be substituted for the inner spring cap (412) by one skilled in the art without departing from the spirit or scope of the invention. The surface of the bracket (410), could, for example, include a circular groove coaxially with the hole for the control arm to secure the end of the spring (414) in place of the inner spring cap (412).

Figure 9A:
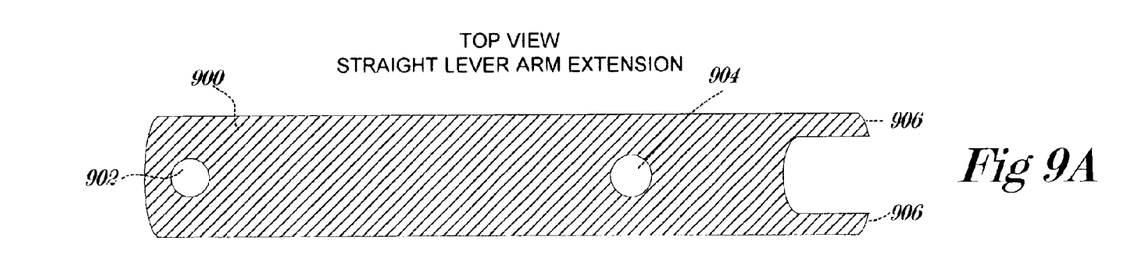
FIGS. 9A, B and C are views of another embodiment of the lever-arm extension of the present invention.
Figure 9B:
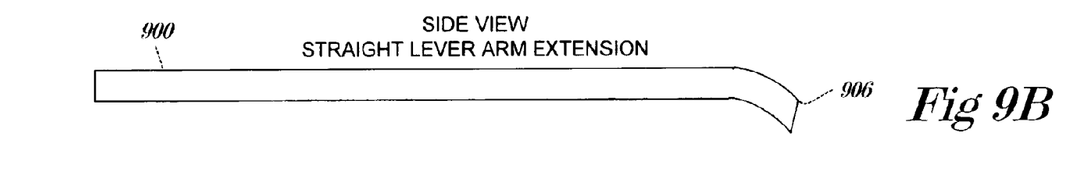
Figure 9C:
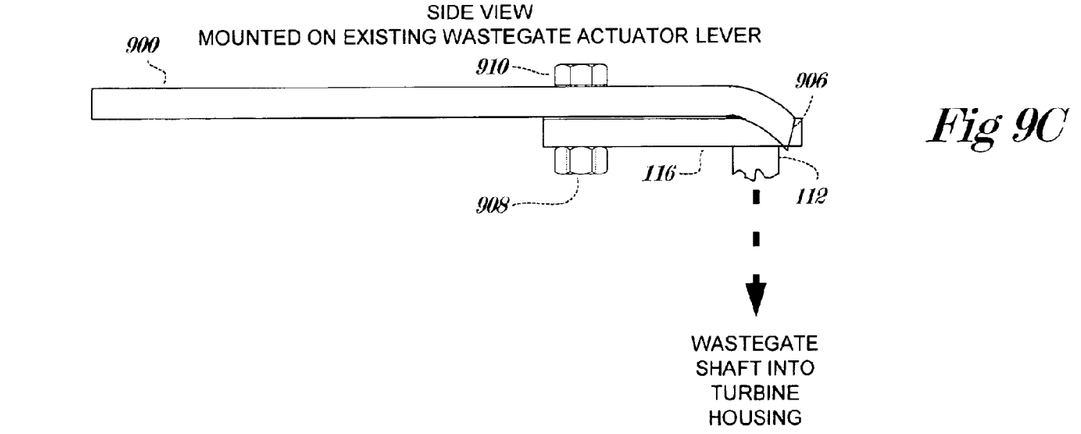

The design of the lever-arm extension as shown in FIG. 5 is suited to the geometry of the mounting bracket placement, wastegate lever arm position and orientation, and clearance in the engine compartment for the GM turbo-diesel. Other vehicles require different lever arms to achieve the same result while allowing the present invention to be mounted such that the vehicle operator has access to the adjusting nut. FIG. 9 is an alternative embodiment of the lever-arm extension, suited for a different mounting geometry. The lever-arm extension of FIG. 9 is also suitable when the wastegate shaft (112) is cut-off at the surface of the lever-arm and does not extend through the lever arm as shown in FIG. 2A. In this case the tongs (906) of the lever-arm extension bend-down to "capture" the wastegate lever arm (116) as shown in FIG. 9C. The bolt (908) and nut (910) assembly make use of the lever-arm through-hole (118) to secure the lever-arm extension to the lever arm at a second point. The control arm is rotatably attached to this embodiment of the lever-arm extension at the second through-hole (902).

Figure 10A:
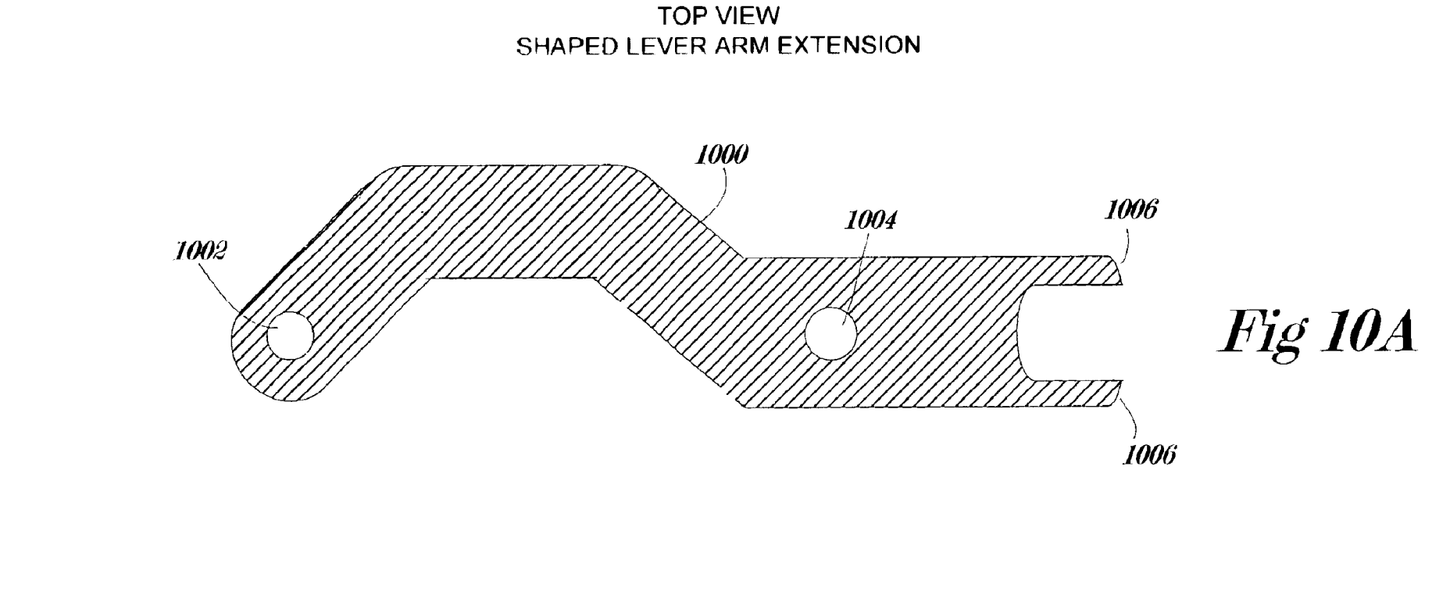
FIGS. 10A and B are views of still another embodiment of the lever arm extension of the present invention. In this embodiment the arm is shaped to provide clearance around other parts.
Figure 10B:
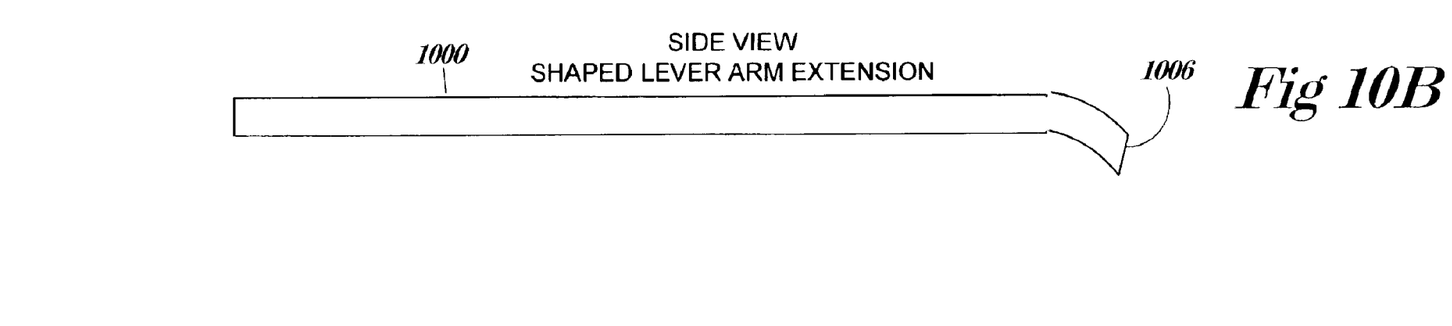

Another embodiment of the lever-arm extension is shown in orthogonal views in FIGS. 10A and 10B. The operation of the bent tongs (1006) and through-hole (1004) are as shown with the previous embodiment (FIG. 9) to secure the extension to the lever-arm. The arm now has additional bends to accommodate clearance around other parts in the engine compartment. The control arm is rotatably attached to this lever-arm extension at the second through-hole (1002).

Operation of the Adjusting Nut

Referring back to FIG. 4, it can be seen that tightening the boost adjust nut (420) on the end of the control arm will tend to compress the spring (414). When the wastegate is closed, the wastegate lever-arm can make no further counter-clockwise rotation. The wastegate lever-arm extension (400) can no longer rotate any further counter-clockwise as well, since it is secured to the lever and cannot rotate relative to it. This means the control arm (430) cannot be pulled further up and to the right, therefore, as the nut (420) is tightened, the outer spring cap (418) must move down, compressing the spring (414). In this manner, the boost-adjusting nut (420) controls the preloading force applied by the spring (414) on the control arm (430). The wide boost adjustment range is made possible by the long threaded section of the control arm.

Improved Boost Regulation

Experimental data measured during the operation of the present invention indicates boost control is accomplished with reduced static friction. Static friction is apparent when the peak boost pressure required to unseat the wastegate valve is higher than that required to keep it open. This results in a peak boost pressure required to unseat the valve, followed by a reduced pressure requirement to keep it open. This uneven pressure regulation is not a desirable operational characteristic, ideally, the valve would be open and remain open at a single boost pressure. The present invention results in better regulation of the boost pressure and reduce drop-off after opening. Since the wastegate valve itself is unaltered in the invention, the some of the sources of static friction responsible for the pressure drop-off in the factory wastegate controller must be other than the valve itself.

The word static friction as applies here, therefore, includes sources of static friction in the system other than the valve itself. In the canister of the factory wastegate controller, the preloaded spring pushes on a disk, which is seated against the back of the canister. Pulling this disk away from the back of the canister may require overcoming some static friction. The higher spring rate of the factory spring, or some other nonlinear action in the spring itself, may also be contributing to static friction in the factory wastegate controller. The boost pressure drop-off after the valve is opened is higher in the factory wastegate controller than in the present invention, and this is an experimentally demonstrated advantage of the invention.

In the present invention, the spring has a lower spring rate and a larger displacement due to the lever-arm extension. In addition, there is no canister for the spring to pull away from. The spring, in the present invention, remains in constant contact with the spring caps, and the spring caps remains in constant contact with the mounting bracket, on one end, and the washer next to the boost adjusting nut, on the other end. Thus there may be static friction mechanisms in the factory wastegate controller which do not exist in the present invention.

Any or all of these may combine to reduce the static friction when compared to the factory controller associated with compressing the spring out of its initial preloaded state, or some other mechanism which has not been identified here.

I claim:

1. A turbocharger wastegate controller comprising:
   a spring;
   a waste gate valve;
   an adjusting nut for controlling the compression in the spring when the wastegate valve is seated;
   a control arm further comprising:
      a first end; and
      a second end;
         wherein the first end has a means for rotatably attaching to a lever arm fixed to a wastegate shaft; and the second end comprises a threaded portion which engages the threads on the adjusting nut;

wherein the control arm passes through a through hole in a mounting bracket;

wherein the spring is mounted over the second end of the control arm with a means for holding the spring substantially coaxially with the long axis of the control arm; and wherein the adjusting nut is seated against a spring cap, and turning the adjustment nut varies the length of the control arm available between the spring cap and the mounting bracket.

2. A turbocharger wastegate controller suitable for aftermarket installation and making use of an existing wastegate valve, wastegate shaft, and a wastegate lever arm comprising:

a lever-arm extension attached to the wastegate lever-arm such that the lever-arm extension rotates with the wastegate lever-arm in response to movement of the existing wastegate valve;

a control arm having a first end rotatably attached to the lever-arm extension and a second end which is threaded;

a bracket with a through-hole for the control arm to pass through and a means for attaching the bracket to a turbocharger housing;

an inner spring cap mounted over the second end of the control arm;

a spring comprising a first and second end wherein the spring is mounted over the second end of the control arm such that the first end of the spring is seated against the inner spring cap;

an outer spring cap mounted over the second end of the control arm and seated against the second end of the spring; and an adjusting nut fitting the threads on the second end of the control arm and seated against the outer spring cap, wherein the compression in the spring is adjusted by turning the adjusting nut.

3. The turbocharger wastegate controller of claim 2 wherein the first end of the control arm comprises:
 a first tong; and
 a second tong,
 wherein through-holes in the first and second tongs are aligned coaxially, and
 the control arm is rotatably fixed to the lever-arm extension by a pin passing through the first tong through-hole, a through-hole in the lever-arm extension, and the second tong through-hole.

4. The turbocharger wastegate controller of claim 3 wherein the pin comprises:
 a first end; and
 a second end,
 wherein the pin is held in place by a means for preventing the first end from sliding into a tong through-hole and a means for preventing the second end from sliding into a tong through-hole.

5. The turbocharger wastegate controller of claim 3 wherein the pin comprises:
 a first end; and
 a second end,
 wherein the first end of the pin is prevented from sliding into the tong through-hole by a head on the pin which is larger in diameter than the tong through-hole, and the second end is of the pin is prevented from sliding into the tong through-hole of a tong by a cotter pin or clip.

6. The turbocharger wastegate controller of claim 2 wherein the lever-arm extension comprises a metal plate of arbitrary shape with three through-holes, wherein
 a first through-hole fits over the wastegate shaft,
 a second through-hole is positioned to match the through-hole in the wastegate lever-arm, and
 a third through-hole is positioned at a distance greater than the second through-hole from the first through-hole,
 wherein the third through-hole is the attachment point for the control arm.

7. The turbocharger wastegate controller of claim 2 wherein the lever-arm extension comprises a first and second end, wherein
 the first end is split into a pair of forked tongs which are bent out of the plane of the arm,
 the second end has a through-hole,
 and there is a second through-hole in the arm in between the first end and through-hole at the second end,
 wherein the second end through-hole is the attachment point for the control arm.

8. A turbocharger wastegate controller suitable for aftermarket installation and making use of an existing wastegate valve, a wastegate shaft, and a wastegate lever arm comprising:

a lever-arm extension attached to the wastegate lever-arm such that the lever-arm extension rotates with the wastegate lever-arm in response to movement of the existing wastegate valve;

a control arm having a first end rotatably attached to the lever-arm extension and a second end which is threaded;

a bracket with a through-hole for the control arm and a means for attaching the bracket to a turbocharger housing, wherein the bracket has a means for capturing the end of a spring such that the spring is held substantially coaxially with the control arm;

the spring comprising a first and second end:
 wherein the spring is mounted over the second end of the control arm such that the first end of the spring is seated against the bracket, an outer spring cap mounted over the second end of the control arm and seated against the second end of the spring; and an adjusting nut fitting the threads on the second end of the control arm and seated against the outer spring cap, wherein the compression in the spring is adjusted by turning the adjusting nut.

9. The turbocharger wastegate controller of claim 8 wherein the first end of the control arm comprises:
 a first tong; and
 a second tong,
 wherein through-holes in the first and second tongs are aligned coaxially, and the control arm is rotatably fixed to the lever-arm extension by a pin passing through the first tong through-hole, a through-hole in the lever-arm extension, and the second tong through-hole.

10. The turbocharger wastegate controller of claim 9 wherein the pin comprises:

a first end; and a second end, wherein the pin is held in place by a means for preventing the first end from sliding into a tong through-hole and a means for preventing the second end from sliding into a tang through-hole.

11. The turbocharger wastegate controller of claim 9 wherein the pin comprises:

a first end; and a second end, wherein the first end of the pin is prevented from sliding into the tong through-hole by a head on the pin which is larger in diameter than the tong through-hole, and the second end is of the pin is prevented from sliding into the tong through-hole of a tong by a cotter pin or clip.

12. The turbocharger wastegate controller of claim 8 wherein the lever-arm extension comprises a metal plate of arbitrary shape with three through-holes, wherein a first through-hole fits over the wastegate shaft, a second through-hole is positioned to match the through-hole in the wastegate lever-arm, and a third through-hole is positioned at a distance greater than the second through-hole from the first through-hole, wherein the third through-hole is the attachment point for the control arm.

13. The turbocharger wastegate controller of claim 8 wherein the lever-arm extension comprises a first and second end, wherein the first end is split into a pair of forked tongs which are bent out of the plane of the arm, the second end has a through-hole, and there is a second through-hole in the arm in between the first end and through-hole at the second end, wherein the second end through-hole is the attachment point for the control arm.

* * * * *